(12) United States Patent
Walston et al.

(10) Patent No.: US 6,931,264 B2
(45) Date of Patent: Aug. 16, 2005

(54) COMMUNICATION DEVICES WITH APPLICATION SHORTCUT KEYS AND METHODS THEREFOR

(75) Inventors: Douglas Walston, Deer Park, IL (US); Jeremy Jobling, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 50 days.

(21) Appl. No.: 10/140,035

(22) Filed: May 6, 2002

(65) Prior Publication Data

US 2004/0192397 A1 Sep. 30, 2004

(51) Int. Cl.$^7$ ................................................. H04Q 7/20
(52) U.S. Cl. .................... 455/566; 455/412.1; 455/418
(58) Field of Search ................................ 455/566, 466, 455/564, 550.1, 575.1, 414.1, 418, 412.1, 460

(56) References Cited

U.S. PATENT DOCUMENTS

| | | | | |
|---|---|---|---|---|
| 5,737,394 A | * | 4/1998 | Anderson et al. | 379/88.11 |
| 6,259,934 B1 | * | 7/2001 | Guerlin | 455/566 |
| 6,442,251 B1 | * | 8/2002 | Maes et al. | 379/93.23 |
| 2002/0065069 A1 | * | 5/2002 | Phillips | 455/419 |
| 2002/0146989 A1 | * | 10/2002 | Moriki | 455/90 |
| 2003/0054841 A1 | * | 3/2003 | Griswold et al. | 455/460 |

* cited by examiner

Primary Examiner—Erika A. Gary
(74) Attorney, Agent, or Firm—Roland K. Bowler, II

(57) ABSTRACT

Method in a communication devices, for example wireless communications handsets, having an application program with an application form into which data may be entered. In some embodiments, an application form of the application program, for example a messaging application form, is displayed (230) in response to depressing a dedicated messaging input key. In other embodiments, displayed information (210 is input to a data field of the application form, for example an address is input to an addressee field of the displayed messaging form.

22 Claims, 5 Drawing Sheets

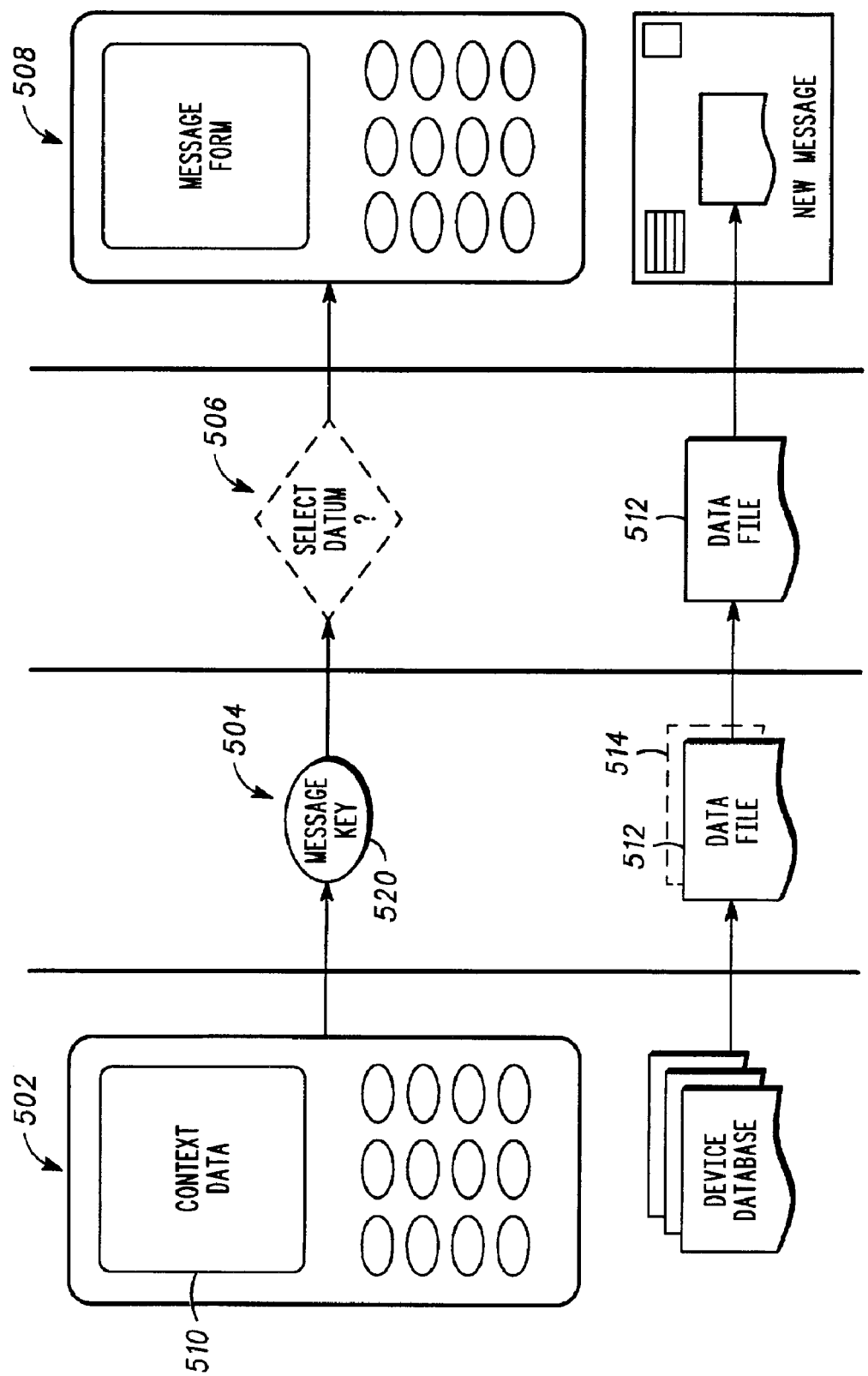

US 6,931,264 B2

COMMUNICATION DEVICES WITH APPLICATION SHORTCUT KEYS AND METHODS THEREFOR

FIELD OF THE INVENTIONS

The present inventions relate generally to communication devices having application programs with application forms into which data is entered, for example messaging applications, and more particularly to communication devices having application form execution shortcut keys.

BACKGROUND OF THE INVENTIONS

Application programs having application forms with data fields requiring user input or completion, for example, messaging applications, are well known. Current user interaction paradigms for creating and sending messages however are characterized generally as cumbersome and lengthy, particularly on communication platforms having limited input and display capabilities, including for example cellular telephones handsets, two-way pagers and wireless enabled personal digital assistants. These and other applications and communication devices will benefit by reducing the demands required of end-users for operating these programs.

The various aspects, features and advantages of the present inventions will become more fully apparent to those having ordinary skill in the art upon careful consideration of the following Detailed Description of the Invention with the accompanying drawings described below.

BRIEF DESCRIPTION OF THE DRAWINGS

FIG. 5 is an exemplary process for using a messaging application on a communications device.

DETAILED DESCRIPTION OF THE INVENTIONS

Figure 1:
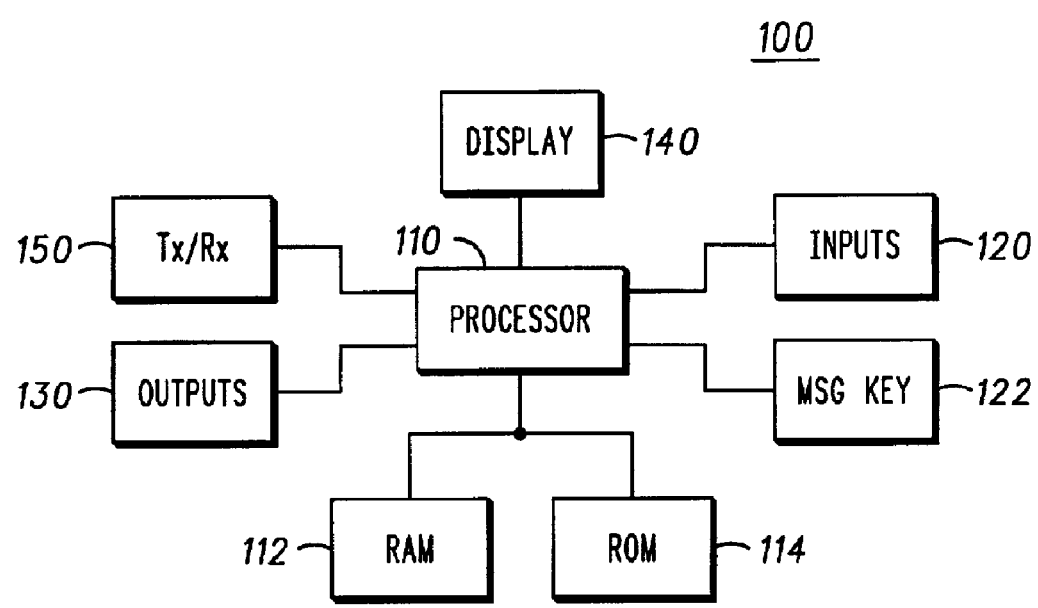
FIG. 1 is an exemplary communications device.

In FIG. 1, a mobile wireless communication device 100 comprises generally a programmable processor 110 coupled to memory, for example RAM 112 and ROM 114. The device includes user inputs 120, for example a keypad, pointer, audio inputs or other input devices, coupled to the processor. There are also outputs 130 coupled to the processor, for example an audio port. In some embodiments, the inputs and outputs constitute a common port, for example a data port. There is also a display 140 coupled to the processor, for example a liquid crystal display (LCD).

The exemplary device 100 is a mobile wireless communication device including a wireless transceiver 150, for example a CDMA or GSM cellular communications transceiver, or an IEEE 802.11b protocol enabling device. In other embodiments, the device 100 could be some other computing device, for example a personal computer or an Internet browsing device, coupled to a hardwired network.

The communications device includes an application program stored in memory. The application program is of the type generally that comprises an application form program segment that generates a user input form having user input data fields that may be populated by the user when the form is displayed. Applications meeting these criteria are common, and include for example messaging applications, browser applications, address applications, calendar applications, multimedia applications, among many others.

In FIG. 1, the device also includes a dedicated hard input key 122, which in some embodiments is a dedicated messaging key. The hard input key is used in connection with one or more applications to reducing the burden on the user, for example as a short cut key, as discussed more fully below.

In some embodiments, the user may select on or more applications with the dedicated hard input key is associated or used, for example by entering user preference configuration information. The specific function of the dedicated hard input key also be specified by the user, for the user may limit the function of the key 122 to opening specific application forms, for example a messaging form, and/or to inputting selected e-mail address information into the addressee field of a messaging application form.

Figure 2:
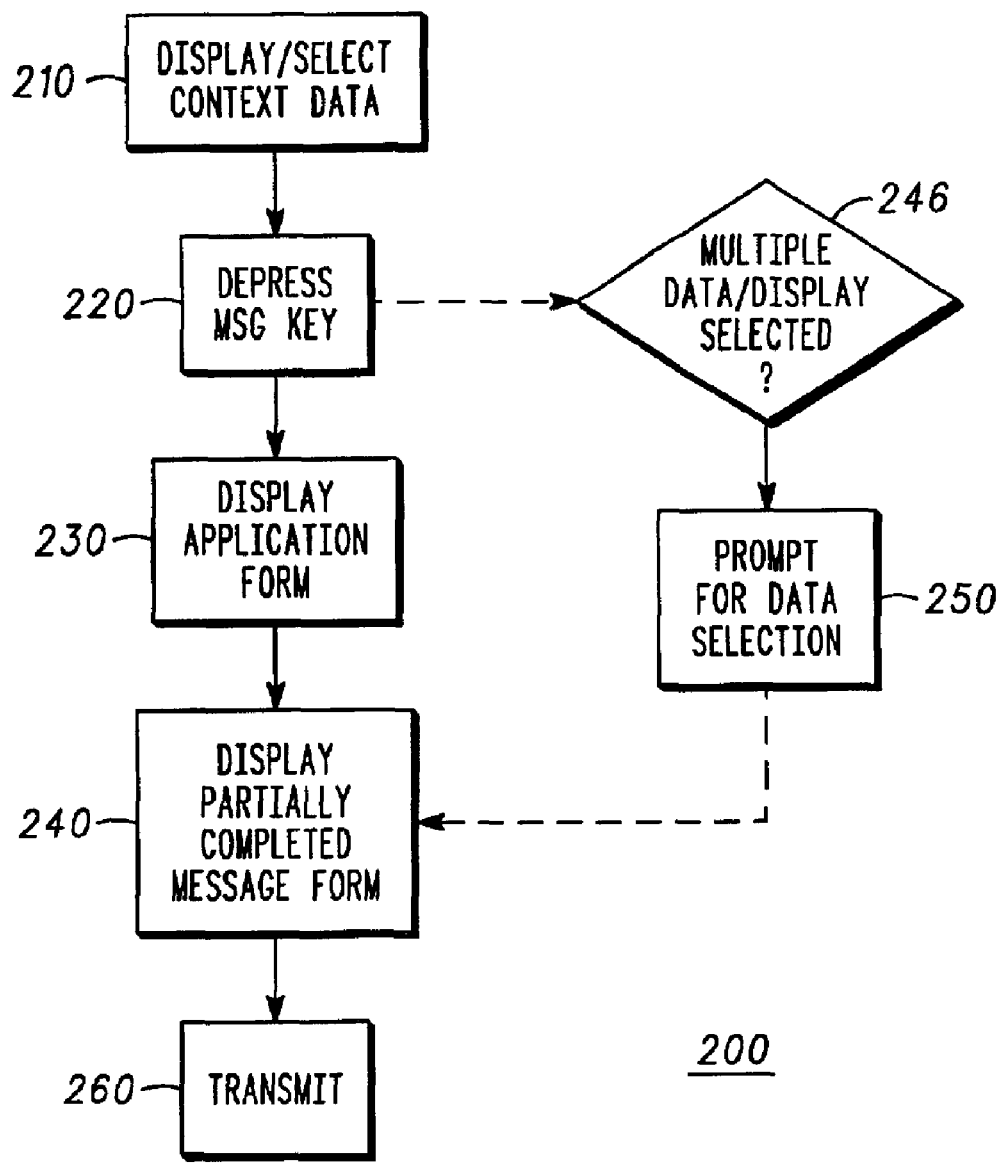
FIG. 2 is an exemplary process flow diagram illustrating various features of the invention.

In the process flow diagram 200 of FIG. 2, at block 210, image information is displayed on a display of the communications device. The image information may be textual or graphical information, including for example universal resource locator (URL) or other links, files and file icons, graphical images, sound files, picture files, video files, animation files, etc.

Figure 3:
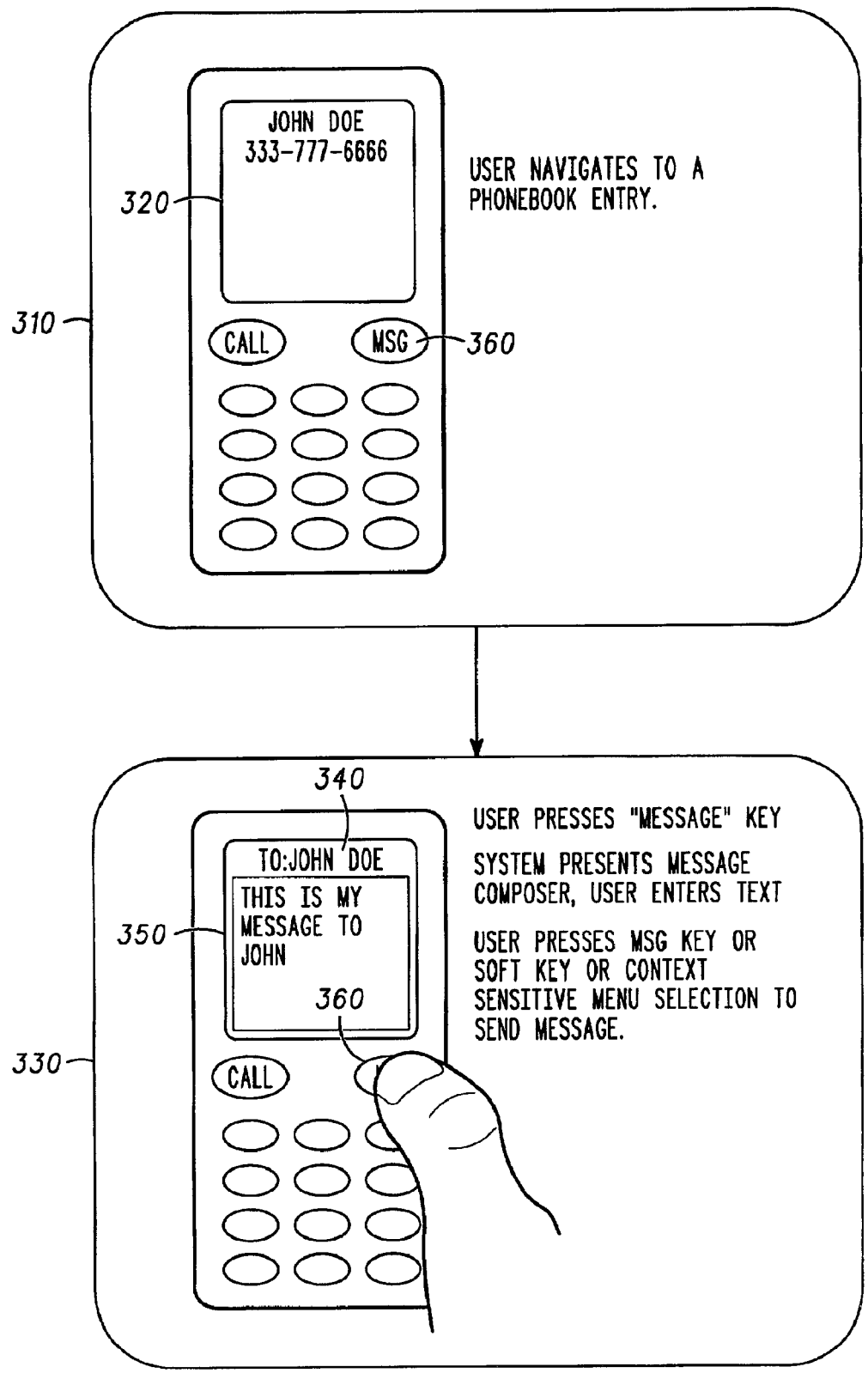
FIG. 3 is an exemplary process for using a messaging application on a communications device.

In the exemplary embodiment of FIG. 3, at block 310, the image information displayed is name and telephone number information 320, obtained for example by navigating a name and address application. Alternatively, this information may come from some other source, for example from another application or from a website displayed on the device.

In FIG. 2, at block, 210, contextual information may be selected from displayed information, for example by blocking or by highlighting information. The particular image information selection method is immaterial. In the exemplary embodiment of FIG. 4, at block 410, a file item 420 is selected by scrolling through a list of file items. Generally, depending upon the application or the function assigned to the dedicated hard input key, more than one file may be selected.

In FIG. 2, at block 220, a dedicated application form prompting input key, for example the exemplary dedicated messaging key 122, is depressed. In one embodiment, at block 230, an application form is displayed upon, or in response to, depressing the form prompting input key. The corresponding application program, for example, may comprise a dedicated hard input key invoked application form segment, whereby the application form is displayed on the device display upon depressing the dedicated application form prompting input key.

In an exemplary application, depression of the dedicated hard messaging key invokes the display of a messaging form, thus alleviating the user from the steps of opening the messaging application and selecting the new message option to display the messaging form. The messaging key may be used alternatively as a short cut key for displaying other application forms, example of which were discussed above.

In another embodiment, at block 240, the displayed/selected image information is entered in a data field of the displayed application form upon, or in response to, depressing the form prompting input key. The corresponding application program may comprise, for example, a dedicated hard input key invoked data field input segment, whereby the displayed/selected data is input to the data field of the application form upon depressing the dedicated hard input key. In other embodiments, the dedicated hard input key merely invokes the display of the application form and the user must complete the form.

It is not necessary in all embodiments for displayed information to be selected before populating the application form with the information. In embodiments where there information displayed is not substantial, as is typical for example on cellular communication handset displays, all displayed information will be input to the application form data field. In instances where it is not possible to import the displayed or selected information, the user may be prompted to take some alternative course of action.

In some embodiments, the application program, for example a messaging application, may recognize displayed or selected address information, for example an e-mail address, and enter it in an address field upon depressing the dedicated messaging key 122. If the displayed or selected information is not an address field, it may be entered automatically into some other field, or alternatively, the user may be prompted to identify the field in which the displayed or selected data should be entered.

In the exemplary messaging application of FIG. 3, at block 330, name information 320 selected at block 310 is automatically populated in an addressee field 340 of a message application form 350 by depressing the dedicated messaging key 360, whereupon the user may then complete other message data fields, if desired, before transmitting the message.

In FIG. 2, at block 250, in some embodiments the user is prompted to select datum of displayed data, for example where the destination data field can accommodate only a limited amount of data or a particular type of data. In some embodiments, at block 248, the user is prompted to select a portion of the displayed data if more than one item of image information is displayed.

In other embodiments, the user is prompted to select an application form, or a field in an application form into which the displayed or selected data will be input upon selecting the dedicated hard input key.

Figure 4:
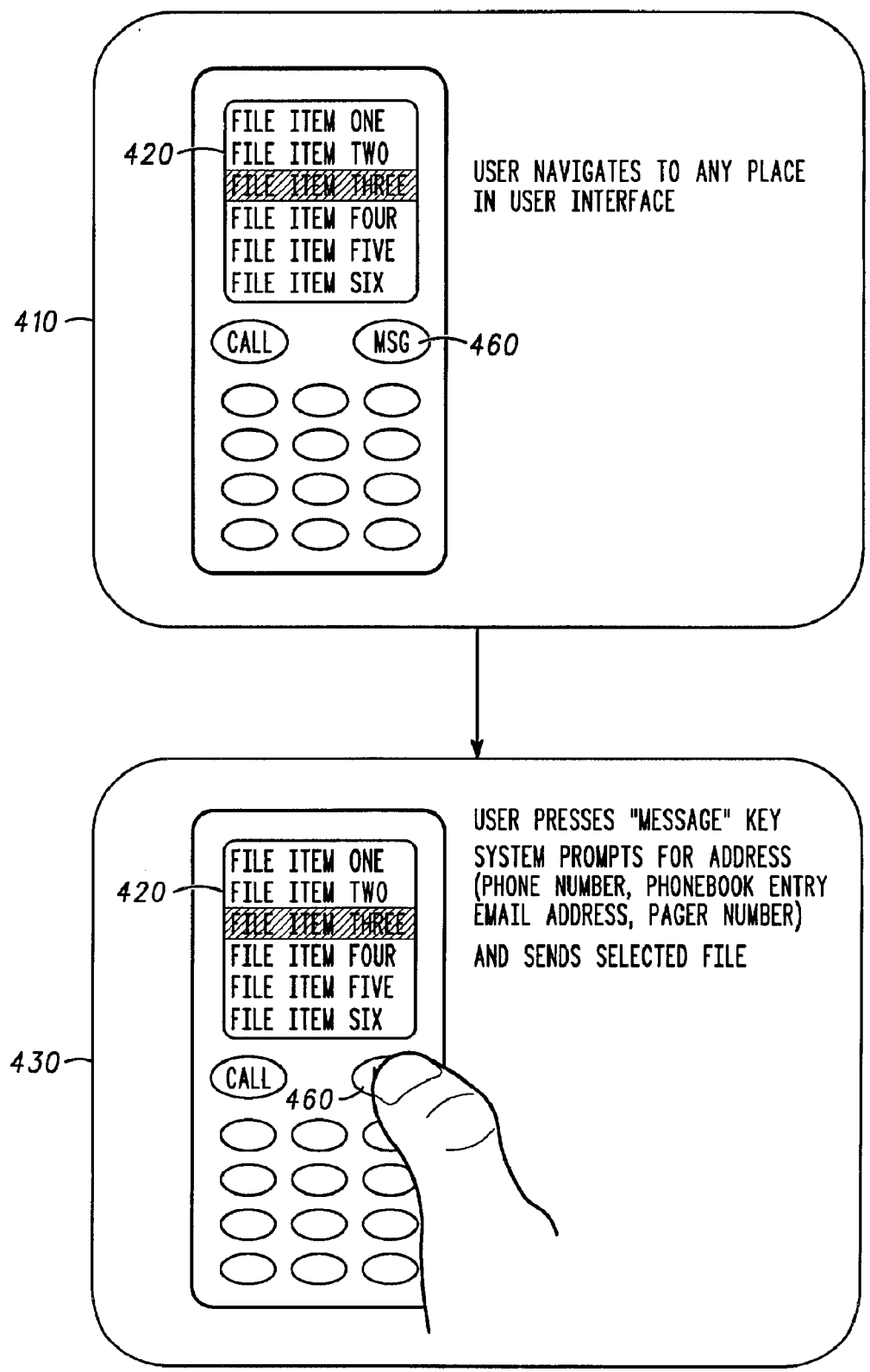
FIG. 4 is another exemplary process for using an application on a communications device.

In FIG. 4, at block 430, in some embodiments, upon depressing the dedicated hard messaging key 460, the selected data item 420 is input to a destination application form data field and transmitted automatically, as indicated at block 260 in FIG. 2. In other embodiments, where additional information is require prior to transmission, the user may be prompted for the data, whereupon the message is then transmitted.

In FIG. 5, at frame 502, displayed contextual information 510 is used to populate a messaging application form by depressing a dedicated hard messaging key 520 at frame 504. At frame 506, the user is prompted to select one of the multiple data files 512 or 514 displayed or selected when the messaging key 520 was depressed. In frame 508, the selected date file, for example a ring-tone file, placed in a data attachment field of a messaging form, which may be transmitted upon completion of the addressee if required.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a wireless communication handset having an application program with an application form into which data may be entered, comprising:
   selecting information displayed on the wireless communication handset;
   depressing a dedicated form prompting key;
   displaying art application form of the application program in response to depressing the dedicated form prompting key;
   entering the selected information in the application form in response to depressing the dedicated form prompting key.

2. The method of claim 1, selecting the information from displayed image information.

3. The method of claim 1,
   the application form is a messaging form of a messaging application,
   opening the messaging application by depressing the dedicated form prompting key,
   displaying the messaging form with the selected information entered in a data field of the messaging form upon depressing the dedicated form prompting key.

4. The method of claim 1,
   prompting selection of a data field in the application form after depressing the dedicated form prompting key before entering the selected information in the application form.

5. The method of claim 1,
   prompting selection of a datum from displayed information after depressing the dedicated form prompting key,
   entering the selected datum in the application form.

6. The method of claim 1,
   the application form is a messaging form,
   prompting selection of a data field in the messaging form after depressing the dedicated form prompting key;
   entering the selected information in the selected data field of the messaging form.

7. The method of claim 6,
   selecting contextual data before depressing the dedicated form prompting key,
   entering the selected contextual data in the data field of the messaging form in response to depressing the dedicated form prompting key.

8. A method in a communication device capable of displaying an application form into which data may be input, comprising:
   selecting information displayed on the communication device;
   depressing a dedicated form prompting input key;
   entering the selected information in a data field of an application form in response to depressing the dedicated form prompting input key.

9. The method of claim 8,
   the displayed information is an address, the application form is a messaging form,
   selecting an address,
   entering the selected address in an address field of the messaging form by depressing the dedicated form prompting input key.

10. The method of claim 8, selecting the displayed information by selecting at least a contextual portion of displayed information.

11. The method of claim 8, displaying the application form with the selected information entered in the data field by depressing the dedicated form prompting input key.

12. The method of claim 8, the displayed information is an address, the application form is an address form, selecting an address, entering the selected address in an address field of the address form by depressing the dedicated form prompting input key.

13. The method of claim 8, the displayed information is a web page, entering a URL of the web page in the data field of the application form by depressing the dedicated form prompting input key.

14. The method of claim 8, entering the selected information in an address field of the application form by depressing the dedicated form prompting input key if the selected information is an address.

15. The method of claim 14, prompting for the identification of a destination data field of the application if the selected information in a not an address.

16. The method of claim 14, entering the selected information in a non-address field of the application form by depressing the dedicated form prompting input key if the selected information is not art address.

17. A communication device comprising:

a processor coupled to memory;

a display coupled to the processor, the display displaying information;

a dedicated application form invoking input key coupled to the processors, an application program stored in memory, whereby an application form of the application program is populated with information selected from the display upon depressing the dedicated application form invoking input key.

18. The communication device of claim 17, the application form having a data field, whereby displayed data is input to the data field of the application form upon depressing the dedicated application form invoking input key.

19. A mobile wireless communication device comprising:

a programmable processor coupled to memory;

an application program stored in the memory;

a radio transceiver coupled to the programmable processor;

a display coupled to the programmable processor;

a dedicated application form invoking input key coupled to the programmable processor;

an application form of the application program is populated with information selected from the display upon depressing the dedicated application form invoking input key.

20. The mobile wireless communication device of claim 19, the application form having a data field, the data field of the application form is populated with the selected information and the populated application form is displayed on the display upon depressing the dedicated application form invoking input key.

21. A method in a wireless communication handset having an application program with an application form into which data may be entered, comprising:

displaying information, depressing a dedicated form prompting key;

prompting selection of a data field in the application form after depressing the dedicated form prompting key;

displaying the application form of the application program in response to depressing the dedicated form prompting key;

entering the displayed information in a selected data field of the displayed application form upon depressing the dedicated form prompting key.

22. A method in a wireless communication handset having an application program with an application form into which data may be entered, comprising:

displaying information;

depressing a dedicated form prompting key;

prompting selection of a portion of the displayed information after depressing the dedicated form prompting key;

displaying an application form of the application program in response to depressing the dedicated form prompting key;

entering a selected portion of the displayed information in the displayed application form upon depressing the dedicated form prompting key.

* * * * *